United States Patent [19]

Kobayashi et al.

[11] Patent Number: 4,727,097

[45] Date of Patent: Feb. 23, 1988

[54] PROCESS FOR PREPARING HIGHLY REACTIVE, WATER-ABSORPTIVE RESIN

[75] Inventors: Takatoshi Kobayashi; Harumasa Yamasaki; Yuzo Sumida, all of Wakayama, Japan

[73] Assignee: Kao Corporation, Tokyo, Japan

[21] Appl. No.: 837,666

[22] Filed: Mar. 4, 1986

Related U.S. Application Data

[63] Continuation of Ser. No. 634,945, Jul. 27, 1984, abandoned.

[30] Foreign Application Priority Data

Aug. 10, 1983 [JP] Japan ................................. 58-146256
Aug. 10, 1983 [JP] Japan ................................. 58-146257

[51] Int. Cl.⁴ ..................... C08L 51/00; C08L 33/02; C08L 63/00
[52] U.S. Cl. ..................... 523/408; 523/409; 523/411; 524/460; 524/507; 524/533; 525/274; 525/108; 525/111; 525/112; 525/113; 525/125; 525/127; 525/155; 525/279; 525/283; 525/293; 525/296; 525/303

[58] Field of Search ............... 525/274, 279, 291, 296, 525/293, 303, 108, 155, 111, 112, 113, 125, 127; 524/460, 507, 533; 523/408, 409, 411

[56] References Cited

U.S. PATENT DOCUMENTS

| | | | |
|---|---|---|---|
| 3,821,145 | 6/1974 | Walus | 525/155 |
| 3,914,341 | 10/1975 | Kliment et al. | 525/303 |
| 3,998,905 | 12/1976 | Labana et al. | 525/108 |
| 4,085,168 | 4/1978 | Milkovich et al. | 525/296 |
| 4,367,323 | 1/1983 | Kitamura et al. | 524/460 |
| 4,339,371 | 7/1982 | Robinson et al. | 524/460 |
| 4,423,165 | 12/1983 | Harper | 523/409 |
| 4,546,014 | 8/1985 | Gajria | 523/409 |
| 4,560,714 | 12/1985 | Gajria | 523/409 |

*Primary Examiner*—C. Warren Ivy
*Attorney, Agent, or Firm*—Flynn, Thiel, Boutell & Tanis

[57] ABSTRACT

A highly reactive, water-absorptive resin is prepared by (1) impregnating a highly water-absorptive resin having carboxyl or carboxylate groups and a water content of 50 percent by weight or lower with a hydrophilic polymer or monomer having a reactive group and (2) polymerizing said monomer or crosslinking said polymer with a crosslinking agent.

13 Claims, No Drawings

PROCESS FOR PREPARING HIGHLY REACTIVE, WATER-ABSORPTIVE RESIN

This application is a continuation of U.S. Ser. No. 634,945, filed July 27, 1984, now abandoned.

The present invention relates to a process for the preparation of highly functional, water-absorptive resins. More particularly, the present invention relates to a process for the preparation of water-absorptive resins having a variety of functional groups rich in reactivity on their surfaces effectively.

Recently there have been developed water-insoluble resins which are swellable in water and exhibit a high power of absorbing aqueous fluids, i.e. so-called "super absorbent polymers". Proposed resins include hydrolyzed starch/acrylonitrile graft copolymers, modified cellulose ethers, polymers and copolymers of acrylic acid or its salts, and starch/sodium acrylate graft copolymers. These resins were in the form of fine particles, that is, powder or granule, and they have been used in the cellulosic absorption structure of disposable diapers, sanitary napkins or other absorbent materials to enhance their absorption efficiencies. However, these resins can serve only to absorb aqueous fluids and no attempts have been made to impart new functions to the resins, for example, attempts to modify the surface of the resin to produce reaction sites thereon. Accordingly, the super absorbent polymers have been used only in the field of sanitary mateials (water absorbents), water retaining agents, heavy metal adsorbents utilizing the functional characteristics of the resins, or the like. Recently, it has been proposed that the known water-absorptive resins as described above be modified to be applied in a more wide range. For example, copolymers comprising a hydrophilic monomer and a monomer having functional groups rich in reactivity have been proposed. However such copolymers have a disadvantage in that the deactivation of the functional groups, gelation or lowering of the absorption power tend to occur during polymerization. Furthermore, with a view to improving water absorption characteristics, the water-absorptive resins have been treated with nonionic surfactants or crosslinked with polyglycidyl ether. Nevertheless, no water-absorptive resins having functional groups rich in reactivity on their surfaces have been provided.

On the other hand, resins which have functional groups on their surfaces and are useful as GPC gel are commercially available. However, these resins have only very small water-absorption power, so that they are useful only in a limited range. Consequently, a resin which has high water-absorption characteristics and contain functional groups on its surface has long been desired, but such a resin has not been provided as yet. It is an object of the present invention to provide such a highly functional resin.

The inventors of the present invention have investigated to obtain fine particles of the highly water-absorptive resins as described above to be applicable in a new, wide range, and have found a process for the preparation of a fine particle of a highly water-absorptive resin having functional groups rich in reactivity on its surface without the lowering of absorptive power, to complete the present invention.

The invention relates to a process for preparing a highly reactive, water-absorptive resin, which comprises the steps of:

(1) impregnating a highly water-absorptive resin having carboxyl or carboxylate groups and a water content of 50 percent by weight or lower with a hydrophilic polymer having a reactive group or hydrophilic monomer having a reactive group and (2) polymerizing said monomer or crosslinking said polymer with a crosslinking agent.

The invention includes two embodiments as mentioned above. One relates to the steps of impregnating the resin with the monomer and polymerizing the monomer. The other concerns the steps of impregnating said resin with the polymer and crosslinking said polymer with the crosslinking agent in order to coat said resin on the surface thereof with the resulting, crosslinked polymer.

The highly water-absorptive resin to be used in the present invention may be any kind of resin having carboxyl or carboxylate groups as the structural units and having water absorption of from 10 to 1500 times its own weight, which may be prepared by any polymerization process. Examples of resins to be preferably used in the present invention include polysodium acrylate prepared by the reversed-phase suspension polymerization as described in, e.g., the Japanese Patent Publication No. 30710/1979 or the Japanese Patent Laid-Open No. 26909/1981, Polysodium acrylate prepared by aqueous solution polymerization (adiabatic polymerization or thin-film polymerization) as described in, e.g., the Japanese Patent Laid-Open No. 133413/1980 and starch/sodium acrylate graft polymer described in, e.g., the Japanese Patent Publication No. 46199/1978. In preparing these polymers, a very slight amount of a crosslinking agent may be added. It is preferred for the polymers to be self-crosslinked. According to the present invention, the water content of the highly water-absorptive resin should be controlled to 50% by weight or below in impregnating the resin with a hydrophilic monomer having reactive functional groups and polymerizing the monomer. Therefore, the resin should be dehydrated after polymerization and thus, from the standpoint of workability, it is preferred to use a polymer prepared by reversed-phase (water-in-oil type) suspension polymerization. Examples of the polymers having carboxyl or carboxylate groups as the structural unit to be used in the present invention include polyacrylic acid (and its salts) and polymethacrylic acid (and its salt), both of which being preferably used. Other preferred examples of polymers to be used in the present invention include copolymers comprising acrylic or methacrylic acid and comonomers such as maleic acid, itaconic acid, acrylamide, 2-acrylamido-2-methylpropanesulfonic acid, 2-(meth) acryloyl ethanesulfonic acid, 2-hydroxyethyl (meth) acrylate or styrene sulfonic acid, provided that the amount of comonomers is in the range in which the characteristics of the highly water-absorptive resin are not lowered.

When employing the method of reversed-phase suspension polymerization, an aqueous solution of a hydrophilic monomer having carboxyl or carboxylate groups, which contains a water-soluble initiator such as persulfate is subjected to reversed-phase suspension polymerization in a nonaqueous solvent in the presence of protective colloids, according to conventional procedures. Examples of the protective colloids to be used in this step include macromolecular dispersants, for example, sorbitan fatty acid esters such as sorbitan monostearate and sorbitan monolaurate; cellulose ethers such as ethylcellulose and benzylcellulose; cellulose esters such as cellulose acetate, cellulose butyrate and cellulose acetate butyrate; maleinized polybutadiene; maleinized polyethylene and maleinized α-olefins. One or more of these colloids may be used. Examples of the nonaqueous solvents to be used in the polymerization step include aliphatic hydrocarbons such as hexane, heptane and octane; cycloaliphatic hydrocarbons such as cyclohexane, methylcyclohexane and decalin; aromatic hydrocarbons such as benzene, toluene and xylene and halogenated hydrocarbons such as chlorobenzene, bromobenzene and dichlorobenzene.

According to the present invention, the water content of a highly water-absorptive resin in the step of coating the resin with a hydrophilic polymer or monomer having functional groups rich in reactivity, is very significant and should not exceed 50% by weight. If it exceeds 50% by weight, the surface coating will not be accomplished sufficiently, and the water absorption capacity and/or the water absorption rate of the resulting resin will be remarkably lowered, so that the effects of the present invention will not be achieved. The water content is preferably from 1 to 50% by weight, more preferably from 10 to 40%.

Methods by which the surface of a highly water-absorptive resin is impregnated with a hydrophilic monomer having reactive functional groups are not limited and may be a variety of processes. For example, when a highly water-absorptive resin is one prepared by water-in-oil suspension polymerization in an organic solvent (reversed-phase suspension polymerization), the water content of the product is reduced to a desired level by an azeotropic dehydration before a hydrophilic monomer is added to the suspension. On the other hand, when a highly water-absorptive resin is one prepared by solution polymerization or thin-film polymerization, the resulting hydrogel is disentegrated and dried to obtain a product having a desired water content before a hydrophilic monomer is added to the dispersion of the product in an organic solvent or to the mixture of the product and an organic solvent. The organic solvent to be used as a dispersant may be be any nonpolar solvent. From the standpoint of safety and workability, well-known aliphatic or cycloaliphatic hydrocarbons having a boiling point of 30° to 200° C. are preferred. Examples of the hydrocarbons include n-hexane, cyclohexane and ligroin.

The hydrophilic monomer having reactive functional groups to be used in the present invention may be any hydrophilic monomer which has polymerizability or copolymerizability and any chemically reactive functional group. Examples of such chemically reactive functional groups include amide, hydroxyl, amino, aldehyde, sulfonic acid, carboxyl and nitrile groups.

The present invention does not exclude the use of other monomers having functional groups which can be converted into reactive functional groups as described above by a chemical reaction after impregnation of a highly water-absorptive resin with them.

Examples of the hydrophilic monomers having such reactive functional groups include nitrogen-containing vinyl monomers such as acrylamide, methacrylamide, N,N-dimethylaminoethyl methacrylate, N,N-diethylaminoethyl methacrylate, vinylpyridine and vinylpyrrolidone; oxygen-containing vinyl monomers such as 2-hydroxyethyl acrylate, 2-hydroxyethyl methacrylate and polyethylene glycol (meth) acrylate; sulfonic acid-containing vinyl monomers such as vinylsulfonate and styrene sulfonic acid and nitrile-containing vinyl monomers such as acrylonitrile and methacrylonitrile.

In impregnating a highly water-absorptive resin with such a hydrophilic monomer, a crosslinking agent may also be added. The addition of a crosslinking agent is desirable in accomplishing crosslinking reaction effectively. when a compound having a plurality of polymerizable double bonds, for example, polyol-polymethacrylate or-polyacrylate such as polyoxyethylene dimethacrylate, pentaerythritol dimethacrylate or sorbitan dimethacrylate is used with a hydrophilic monomer, a crosslinking reaction proceeds in parallel with the polymerization of the hydrophilic monomer. Furthermore, when a compound having groups which are copolymerizable with a hydrophilic monomer and those which are reactive with the highly water-absorptive resin or the hydrophilic monomer is used with the hydrophilic monomer as a crosslinking agent the compound will be copolymerized during the polymerization of the hydrophilic monomer and, after or during this polymerization, will react with the water-absorptive resin or a polymer of the hydrophilic monomer to form a crosslinkage. Additionally, a crosslinking agent having at least two functional groups which are reactive with functional groups of a hydrophilic monomer or a highly water-absorptive resin may be used with the hydrophilic monomer, and in such a case the crosslinkage will be formed after or during the polymerization of the hydrophilic monomer. Examples of such crosslinking agents include polyglycidyl ether such as ethylene glycol diglycidyl ether, polyethylene glycol diglycidyl ether and glycerin triglycidyl ether; halo-epoxy compounds such as epichlorohydrin and α-methylchlorohydrin; polyaldehydes such as glutaraldehyde and glyoxal; polyols such as glycerin, pentaerythritol and ethylene glycol and polyamines such as ethylenediamine. These crosslinking agents may be added after the polymerization of a hydrophilic monomer having reactive functional groups to bring about a crosslinking reaction.

The polymerization reaction according to the present invention is carried out by adding a water-soluble radical initiator. The water-soluble initiator such a persulfates, hydroperoxides or azo compounds is used at an adequate amount level which varies depending on the amount of monomers on the object of the modification. It is preferred to add such an initiator during or after the impregnation of monomers. When a highly water-absorptive resin prepared by thin-film polymerization is used, for example, the polymer gel product is disentegrated and dried to control the water content. The resulting resin and an organic solvent are fed to a kneader, followed by the addition of a crosslinking agent, a hydrophilic monomer and an initiator. The mixture is heated to modify the surface of the resin. The heating of the mixture is desirable to accomplish the surface modification reaction smoothly. It is preferred to carry out the reaction at a temperature of from 40° to 150° C.

According to the present invention, the amount of the hydrophilic monomer to be added to the highly water-absorptive resin can be varied over a wide range, depending on its use. Generally it is from 1 to 100% by weight, preferably from 1 to 30% by weight based on the total amount of the highly water-absorptive resin. If it is less than 1% by weight, the effect of the surface modification will not be sufficient, while if it is more than 100% by weight, the surface of the resin will not be modified uniformly and the water absorption capacity of the modified resin will be lowered unfavorably.

The amount of the crosslinking agent to be added, which varies depending on the kind of the crosslinking agent and the hydrophilic monomer, is generally from 0.01 to 5.0% by weight.

The hydrophilic polymer having reactive functional groups to be used in the present invention may be any hydrophilic polymer having any chemically reactive functional group. Furthermore, it may be any polymer having functional groups which can be converted into chemically reactive functional groups by chemical reaction after coating the resin with it.

Examples of such chemically reactive functional groups include amide, hydroxyl, amino, aldehyde, sulfonic acid and carboxyl groups. Examples of hydrophilic polymers having such reactive functional groups include polymers and copolymers of nitrogen-containing vinyl monomers such as (meth)-acrylamide, N,N-dimethylaminoethyl (meth)acrylate, N,N-diethylaminoethyl (meth)acrylate, vinylpyridine, vinylpyrrolidone and allylamine; hydroxyl-containing vinyl monomers such as 2-hydroxyethyl (meth)acrylate and polyethylene glycol (meth)acrylate and sulfonic acid-containing vinyl monomers such as vinylsulfonate, styrene sulfonic acid and 2-acrylamido-2-methylpropanesulfonic acid; polyethyleneimine; polyacrolein; polyethylene glycol and Hofmann degradation product of polyacrylamide. Though the molecular weights of these polymers are not limited, they are preferably from 1,000 to 500,000.

In coating a highly water-absorptive resin with such a hydrophilic polymer, it is indispensable to add a crosslinking agent having at least two functional groups which can react with the functional groups of the hydrophilic polymer. Examples of the crosslinking agents to be used in this step include polyglycidyl ethers such as ethylene glycol diglycidyl ether, polyethylene glycol diglycidyl ether and glycerin triglycidyl ether; haloepoxy compounds such as epichlorohydrin and α-methylchlorohydrin; polyaldehydes such as glutaraldehyde and glyoxal; polyols such as glycerin, pentaerythritol and ethylene glycol and polyamines such as ethylenediamine.

Methods by which the surface of a highly water-absorptive resin is coated with the hydrophilic polymer having functional groups rich in reactivity are not limited and may be a variety of processes. For example, when a highly water-absorptive resin is one prepared by reversed-phase suspension polymerization, a hydrophilic polymer which contains a crosslinking agent is added to a dispersion of a highly water-absorptive resin, the water content of which has been controlled in the range of the present invention, in an organic solvent and the resultion mixture is heated.

On the other hand, when a super water-absorptive resin is one prepared by thin-film polymerization or the like, the resulting polymer gel is disintegrated and dried to obtain a product having a water content controlled in the range as defined in the invention. Then, the product and an organic solvent are introduced into a kneader, followed by the addition of a hydrophilic polymer and a crosslinking agent. The resulting mixture is heated. It is preferred to heat the mixture to carry out the surface coating smoothly, and the reaction is preferably carried out at from 40° to 150° C.

An organic solvent to be used as a dispersant may be any nonpolar solvent. From the standpoint of safety and workability, aliphatic or cycloaliphatic hydrocarbons having a boiling point of 30° to 200° C. are preferred. Examples of the hydrocarbons include n-hexane, cyclohexane and ligroin.

According to the present invention, the amount of the hydrophilic polymer to be added to the highly water-absorptive resin can be varied over a wide range, depending on its use. Generally it is from 1 to 100% by weight, preferably from 1 to 30% by weight based on the total amount of the highly water-absorptive resin. If it is less than 1% by weight, the effect of the surface coating will not be sufficient, while if it is more than 100% by weight, the surface of the resin will not be coated uniformly and the water absorption capacity of the modified resin will be lowered unfavorably.

The amount of the crosslinking agent to be added, which varies depending on the kind of the crosslinking agent and the hydrphilic polymer, is generally from 0.01 to 5.0% by weight.

The surface-modified resin according to the first embodiment of the invention has a form which can be converted into an absorbent material having fixed fine particle form. For example, in preparing a polyurethane from organic polyisocyanate and polyol, a surface-modified, water-absorptive resin, the surface of which is covered with hydroxy or amino groups, is added to the reaction mixture to obtain an abosrbent which has a continuous absorption structure bonded to the polyurethane by a covalent linkage.

Also the product of the second embodiment of the invention has been coated on the surface thereof and eventually has the same form as mentioned above.

The resulting absorbents have a wide range of applications such as sanitary materials, water retaining agents, water stopping agents or dehydrating agents. Fruthermore the absorbents play a part as a sweating inhibitor in plastic building materials and are blended with other resins to form wrapping materials.

In addition, the surface-modified, water-absorptive absorptive resin according to the present invention is useful as a macromolecular catalyst such as a phase transfer catalyst or an enzyme-immobilized support; and a chelate resin having a power of capturing heavy metals, noble metals or toxic metals. Furthermore it is useful in sanitary fields such as flocculating-precipitating agents or ion exchange resins or in new fields other than agriculture.

The following examples are to further illustrate the invention, but not to limit it. Comparative Examples 1 to 3 show cases in which a hydrophilic monomer having reactive functional groups is added to the monomer for the preparation of a highly water-absorptive resin and both monomers are copolymerized. Comparative Example 4 shows a case where the highly water-absorptive resin is not coated with a hydrophilic polymer having reactive groups. Comparative Example 5 shows a case where a hydrophilic polymer having reactive functional groups is added to the monomers for the preparation of a highly water-absorptive resin before the monomers are polymerized in the presence of the hydrophilic polymer.

In the following Examples and Comparative Examples, each water absorption capacity was determined according to the following method. About 1 g of a polymer was dispersed and swelled in a large excess of physiological saline. The swelled polymer was filtered by an 80-mesh woven metal screen. The weight of the resulting swelled polymer (W) was measured and divided by the initial weight of the polymer ($W_o$).

Water absorption capacity $(g/g) = W/W_o$

On the other hand, the water absorption rate is represented by the amount of physiological saline which was absorbed by 0.5 g of a polymer in 10 minutes.

EXAMPLE 1

500 ml of cyclohexane and 3.69 g of sorbitan monostearate were introduced into a 1000-ml four-necked flask equipped with a stirrer, a reflux condenser, a dropping funnel and a nitrogen gas inlet tube. Gaseous nitrogen was introduced into the flask to remove dissolved oxygen. The temperature of the content was raised to 75° C. Separately, 60 g of acrylic acid in another flask was neutralized by a solution of 25.0 g of 98% caustic soda in 80 g of ion exchanged water, while cooling the flask content externally. 0.2 g of potassium persulfate was added to this flask and dissolved, and thereafter gaseous nitrogen was introduced into the flask to remove oxygen dissolved in the aqueous solution. The content of this flask was dropwise added to the four-necked flask described above over one hour to polymerize the acrylic monomer. After the polymerization, the reaction mixture was distilled azeotropically by a dehydration tube to remove 76 g of water. The water content of this water-absorptive resin was 17.0%. A solution 15 g of 2-hydroxyethyl acrylate, 0.1 g of potassium persulfate and 0.06 g of ethylene glycol diglycidyl ether (as a crosslinking agent) in 15 g of water was added to a dispersion of the water-absorptive resin in cyclohexane, The resulting mixture was maintained at 75° C. for one hour to complete the reaction. The reaction mixture was distilled under a reduced pressure to strip off the cyclohexane. The remaining swollen polymer was dried at from 80° to 100° C. under a reduced pressure to obtain a highly water-absorptive resin having hydroxyl groups on its surface.

30 g of the obtained resin was added to 281 g of a semi-prepolymer (NCO content: 30%) prepared by the reaction of 200 g of polytetramethylene ether glycol having a molecular weight of 2000 and 81 g of TDI-80 (2, 4/2, 6 isomer ratio: 80/20), followed by mixing to disperse the former in the latter. 96 g of a polyether polyol (hydroxyl number: 32, primary OH group content: 30%) prepared by the addition reaction of propylene oxide to glycerin followed by chipping of the product of the addition reaction with ethylene oxide and 2.0 g of trimethylolpropane were added to the above mixture. The resulting mixture was cured at 75° to 80° C. for 10 minutes to obtain a polyurethane/highly water-absorptive resin film. When the film was swelled in a large excess of water, the highly water-absorptive resin was not released from the polyurethane film. It is clear from this result that the isocyanate group (NCO) reacted with the hydroxyl group in the film to form a covalent bond and the hydoxyl groups were present on the surface of the highly water-absorptive resin effectively.

EXAMPLE 2

500 ml of cyclohexane and 3.72 g of ethylcellulose (a product of Hercules, trade-mark: Ethylcellulose N-200) were introduced into a 1000-ml four-necked round flask equipped with a stirrer, a reflux condenser, a dropping funnel and a nitrogen gas inlet tube. Gaseous nitrogen was introduced into the flask to remove dissolved oxygen. The temperature of the content was raised to 75° C. Separately, 60 g of acrylic acid in another flask was neutralized by a solution of 22.1 g of 98% caustic soda in 80 g of ion exchanged water, while cooling the flask content externally. 0.2 g of potassium persulfate was added to this flask and dissolved, and thereafter gaseous nitrogen was introduced into the flask to remove oxygen dissolved in the aqueous solution. The content of this flask was added at once to the four-necked flask described above to polymerize the acrylic monomer. After the polymerization, the reaction mixture was distilled azeotropically by a dehydration tube to remove 62.8 g of water. The water content of this water-absorptive resin was 24.6%. A solution of 10 g of 2-hydroxyethyl acrylate, 0.1 g of potassium persulfate and 0.5 g of N,N'-methylene-bis-acrylamide (as a crosslinking agent) in 10 g of water was added to a dispersion of the water-absorptive resin in cyclohexane. After the addition, the mixture was maintained at 75° C. for one hour to continue the reaction. The reaction mixture was distilled under a reduced pressure to strip off the cyclohexane. The remaining swollen polymer was dried at 80° to 100° C. under a reduced pressure to obtain a highly water-absorptive resin having hydroxyl groups on its surface.

30 g of this highly water-absorptive resin was added to 140.5 g of a semi-prepolymer (NCO content: 30%) prepared by the reaction of 100.0 g of polyethylene glycol having a molecular weight of 2000 and 40.5 g of TDI-80 (2,4/2,6 isomer ratio: 80/20), followed by mixing to disperse the former in the latter. 48 g of a polyether polyol (hydroxyl number: 32, primary OH group content: 30%) prepared by the addition reaction of propyleneoxide to glycerin followed by chipping of the product of the addition reaction with ethylene oxide and 1.0 g of trimethylolpropane were added to the mixture. The resulting mixture was cured at 80° C. for 10 minutes to obtain a polyurethane/highly water-absorptive resin film. When the film was swelled in a large excess of water, the highly water-absorptive resin was not released from the polyurethane film. It is clear from this result that the isocyanate group (NCO) reacted with the hydroxyl group to form a covalent bond.

EXAMPLE 3

The same procedure as described in Example 1 was repeated, except that 20 g of 2-hydroxyethyl methacrylate was used instead of 15 g of 2-hydroxyethyl acrylate. Using the resulting resin, a highly water-absorptive resin-containing polyurethane film was prepared according to the procedure described in Example 1. When the film was swelled in water, the resin was not released from the film.

EXAMPLE 4

The same procedure as described in Example 1 was repeated, except that 10 g of N,N-dimethylaminoethyl methacrylate was used instead of 2-hydroxyethyl acrylate, to obtain a highly water-absorptive resin having amino groups on its surface.

10 g of this resin was added to 100 ml of a 500 ppm aqueous solution of copper sulfate and swelled sufficiently. The analysis of the supernatant liquid showed that the presence of poly-N,N-dimethylaminoethyl methacrylate was not detectable. In addition, the copper sulfate concentration of the aqueous solution was lowered to 4 ppm. It is clear from these results that amino groups were present effectively on the surface of the highly water-absorptive resin.

COMPARATIVE EXAMPLE 1

500 ml of cyclohexane and 3.72 g of ethylcellulose (a product of Hurcules, trade-mark: Ethylcellulose N-200) were introduced into a 1000-ml four-necked round flask equipped with a stirrer, a reflux condenser, a dropping funnel and a nitrogen gas inlet tube. Gaseous nitrogen was introduced into the flask to remove dissolved oxygen. The temperature of the content was raised to 75° C. Separately, 60 g on acrylic acid in anothe flask was neutralized by a solution of 22.1 g of 98% caustic soda in 80 g of ion exchanged water, while cooling the content externally. 10 g of 2-hydroxyethyl acrylate was added to the flask, followed by the addition and dissolution of 0.2 g of potassium persulfate and 0.5 g of N,N'-methylenebisacrylamide. Gaseous nitrogen was introduced into the flask to remove oxygen dissolved in the aqueous solution. The content of this flask was added at once to the four-necked flask described above to polymerize the monomers. After the polymerization, the reaction mixture was distilled azeotropically to remove 62.8 g of water. The resulting residue was distilled under a reduced pressure to strip off the cyclohexane and the remaining swollen polymer was dried at 80° to 100° C. under a reduced pressure to obtain a hyghly water-absorptive resin.

Using this resin, a highly water-absorptive resin-containing polyurethane film was prepared according to the procedure as described in Example 1. When the resulting film was swelled in a large excess of water, 86% of the resin, based on the total amount of the water-absorptive resin contained in the film, was released.

COMPARATIVE EXAMPLE 2

The same procedure as described in comparative Example 1 was repeated, except that 4-vinylpyridine was used instead of 2-hydroxyethyl acrylate to obtain a highly water-absorptive resin.

COMPARATIVE EXAMPLE 3

The same procedure as described in Comparative Example 1 was repeated, except that 10 g of N,N-dimethylaminoethyl acrylate was used instead of 2-hydroxyethyl acrylate to obtain a highly water-absorptive resin.

10 g of this resin was added to 1000 ml of a 500 ppm aqueous solution of copper sulfate and sweleld sufficiently. The copper sulfate concentration of the resulting supernatant liquid was lowered to 153 ppm, but the copper sulfate capturing power was insufficient.

The water absorption capacity and the water absorption rate of each highly water-absorptive resin of Examples 1 to 4 and Comparative Examples 1 to 3 are shown in Table 1.

It is clear from Table 1 that the process according to the present invention can modify the surface of a highly water-absorptive resin without lowering the water absorption capacity to produce a surface-modified resin useful over a wide range of applications.

TABLE 1

| Experiment No. | | Water absorption capacity (g/g) | Water absorption rate (ml/0.5 g polymer, 10 min.) |
| --- | --- | --- | --- |
| Example | 1 | 57 | 15 |
| | 2 | 55 | 17 |
| | 3 | 58 | 16 |
| | 4 | 57 | 15 |
| Comparative | 1 | 39 | 10 |
| Example | 2 | 33 | 11 |
| | 3 | 35 | 10 |

EXAMPLE 5

500 ml of cyclohexane and 3.69 g sorbitan monostearate were introduced into a 1000-ml four-necked flask equipped with a stirrer, a reflux condenser, a dropping funnel and a nitrogen gas inlet tube. Gaseous nitrogen was introduced into the flask to remove dissolved oxygen. The temperature of the content was raised to 75° C. Separately, 60 g of acrylic acid in another flask was neutralized by a solution of 25.0 g of 98% caustic soda in 80 g of ion exchanged water, while cooling the flask content externally. 0.2 g of potassium persulfate and 0.3 g of N,N'-methylene-bis-acrylamide were added to this flask and dissolved, and thereafter gaseous nitrogen was introduced into the flask to remove oxygen dissolved in the aqueous solution. The content of this flask was dropwise added to the four-necked flask described above over one hour to polymerize the acrylic monomer. After the polymerization, the reaction mixture was distilled azeotropically by a dehydration tube to remove 76 g of water. The water content of this water-absorptive resin was 17.0%. A solution of 15% of poly(2-hydroxyethyl acrylate) (molecular weight: 10,000), and 0.1 g of ethylene glycol diglycidyl ether in 10 g of water was added to a dispersion of the water-absorptive resin in cyclohexane. The resulting mixture was reacted at 75° to 80° C. for one hour. The reaction mixture was distilled under a reduced pressure to strip off the cyclohexane. The remaining swollen polymer was dried at from 80° to 100° C. under a reduced pressure to obtain a highly water-absorptive resin having hydroxyl grups on its surface.

30 g of the obtained resin was added to 281 g of a semi-prepolymer (NCO content: 30%) prepared by the reaction of 200 g of polytetramethylene ether glycol having a molecular weight of 2000 and 81 g of TDI-80 (2,4/2,6 isomer ratio: 80/20), followed by mixing to disperse the former in the latter. 96 g of a polyether polyol (hydroxyl number: 32, primary OH group content: 30%) prepared by the addition reaction of propylene oxide to glycerin followed by tipping or capping of the product of the addition reaction with ethylene oxide and 2.0 g of trimethylolpropane were added to the above mixture. The resulting mixture was cured at 75° to 80° C. for 10 minutes to obtain a polyurethane/highly water-absorptive resin film. When the film was swelled in a large excess of water, the highly water-absorptive resin was not released from the polyurethane film. It is clear from this result that the isocyanate group (NCO) reacted with the hydroxyl group in the film to form a covalent bond and the hydroxyl group were present on the surface of the highly water-absorptive resin effectively.

EXAMPLE 6

500 ml of cyclohexane and 3.72 g of ethylcellulose (a product of Hercules, trade-mark: Ethylcellulose N-200) were introduced into a 1000-ml four-necked round flask equipped with a stirrer, a reflux condenser, a dropping funnel and a nitrogen gas inlet tube. Gaseous nitrogen was introduced into the falsk to remove dissolved oxygen. The temperature of the content was raised to 75° C. Separately, 60 g of acrylic acid in another flask was neutralized by a solution of 22.1 g of 98% caustic soda in 80 g of ion exchanged water, while cooling the flask content externally. 0.2 g of potassium persulfate was added to this flask and dissolved, and thereafter gaseous nitrogen was introduced into the flask to remove oxygen dissolved in the aqueous solution. The content of this flask was added at once to the four-necked flask described above the polymerize the acrylic monomer. After the polymerization, the reaction mixture was distilled azeotropically by a dehydration tube to remove 62.8 g of water. The water content of this water-absorptive resin was 24.6%. A solution of 18 g of poly(tetraethylene glycol acrylate) (molecular weight: 12,000) and 0.1 g of epichlorohydrin in 15 g of water was added to a dispersion of the water-absorptive resin in cyclohexane. After the addition, the mixture was maintained at 75° C. for 2 hours to continue the reaction. The reaction mixture was distilled under a reduced pressure to strip off the cyclohexane. The remaining swollen polymer was dried at 80° to 100° C. under a reduced pressure to obtain a highly water-absorptive resin having hydroxyl groups on its surface.

30 g of this highly water-absorptive resin was added to 140.5 g of a semi-prepolymer (NCO content: 30%) prepared by the reaction of 100.0 g of polyethylene glycol having a molecular weight of 2000 and 40.5 g of TDI-80 (2,4/2,6 isomer ratio: 80/20), followed by mixing to disperse the former in the latter. 48 g of a polyether polyol (hydroxyl number: 32, primary OH group content: 30%) prepared by the addition reaction of propyleneoxide to glycerin followed by tipping or capping of the product of the addition reaction with ethylene oxide and 1.0 g of trimethylolpropane were added to the mixture. The resulting mixture was cured at 80° C. for 10 minutes to obtain a polyurethane/highly water-absorptive resin film. When the film was swelled in a large excess of water, the highly water-absorptive resin was not released from the polyurethane film. It is clear from this result that the isocyanate group (NCO) reacted with the hydroxyl group to form a covalent bond.

EXAMPLE 7

The same procedure as described in Example 5 was repeated, except that the water content of a polymer was reduced tp 20% by azeotropic dehydration and that a solution of 10 g of poly(N,N-dimethylaminoethyl acrylate) of a molecular weight of 8,000 and 0.25 g of glycerin diglycidyl ether in 5 g of water was used instead of a solution of poly(2-hydroxyethyl acrylate) and ethylene glycol diglycidyl ether, and thereafter the mixture was heated at 60° to 70° C. for 3 hours. A highly water-absorptive resin having amino groups on its surface was obtained. 10 g of this resin was added to 1000 ml of a 500 ppm aqueous solution of copper sulfate and swelled sufficiently. The analysis of the supernatant liquid showed that the presence of poly(N,N-dimethylaminoethyl acrylate) was not detectable. The copper sulfate concentration of the aqueous solution was lowered to 10 ppm. It is clear from this result that the surface of the resin was coated with poly (N,N-dimetnylaminoethyl acrylate) effectively.

EXAMPLE 8

The same procedure as described in Example 5 was repeated, except that 75 g of water was removed to reduce the water content to 15.1% and that a solution of 8 g of polyethyleneimine (a product of Japan Catalyst Chemical Industries, Co. Ltd., trademark: SP-200, molecular weight: 20,000) in 15 g of water was used instead of poly(2-hydroxyethyl acrylate), followed by the addition of a solution of 0.2 g of ethylene glycol diglycidyl ether in 1 g of water and the resulting mixture was heated at 75° C. for one hour. A highly water-absorptive resin having amino groups on its surface was obtained.

10 g of this resin was added to 1000 ml of a 500 ppm aqueous solution of copper sulfate and swelled sufficiently. The analysis of the supernatant liquid showed that the presence of polyethyleneimine was not detectable and that the copper sulfate concentration was lowered to 4 ppm. It is clear that the surface of the highly water-absorptive resin was coated with polyethyleneimine effectively.

COMPARATIVE EXAMPLE 4

500 ml of cyclohexane and 3.7 g of sorbitan monostearate were introduced into a 1000-ml four-necked round flask equipped with a stirrer, a reflux condenser, a dropping funnel and a nitrogen gas inlet tube. Gaseous nitrogen was introduced into the flask to remove dissolved oxygen. The temperature of the content was raised to 75° C. Separately, 60 g of acrylic acid in another flask was neutralized by a solution of 22.1 g of 98% caustic soda in 80 g of ion exchanged water, while cooling the content externally. 0.2 g of potassium persulfate and 0.05 g of N,N'-methylene-bis-acrylamide was added to the flask and gaseous nitrogen was introduced into the flask to remove oxygen dissolved in the aqeuous solution. The content of this flask was added at once to the four-necked flask described above to polymerize the monomers. After the polymerization, the reaction mixture was distilled azeotropically to remove 62.8 g of water. The resulting residue was distilled under a reduced pressure to strip off the cyclohexane and the remaining swollen polymer was dried at 80° to 100° C. under a reduced pressure to obtain a highly water-absorptive resin.

Using this resin, a highly water-absorptive resin-containing polyurethane film was prepared according to the procedure as described in Example 5. When the resulting film was swelled in a large excess of water, 86% of the resin, based on the total amount of the water-absorptive resin contained in the film, was released.

COMPARATIVE EXAMPLE 5

The dissolution of a polymer, such as poly(2-hydroxyethyl acrylate, poly(N,N-dimethylaminoethyl acrylate or polyethyleneimine, in an aqueous solution of sodium acrylate was tried with a view to obtaining a polymer having hydroxyl or amino groups on its surface according to the procedure as described in Example 5 to 8. But, the dissolution was not successful or gelation occurred and therefore an objective resin was not obtained.

The water absorption capacity and the water absorption rate of each surface-active, highly water-absorptive resin of Examples 5 to 8 and Comparative Examples 4 and 5 are shown in Table 2.

It is clear from Table 2 that the process according to the presnt invention can coat the surface of a highly water-absorptive resin without lowering the water absorption capacity to produce a surface-coated resin useful over a wide range of applications.

TABLE 2

| Experiment No. | | Water absorption capacity (g/g) | Water absorption rate (ml/0.5 g polymer, 10 min) |
| --- | --- | --- | --- |
| Example | 1 | 51 | 15 |
| | 2 | 50 | 17 |
| | 3 | 52 | 16 |
| | 4 | 50 | 15 |
| Comparative | 1 | 50 | 18 |
| Example | 2 | gelation | — |

The embodiments of the invention in which an exclusive property or privilege is claimed are defined as follows:

1. A process for preparing a highly reactive, water-absorptive resin, which comprises the steps of:

mixing (1) an aqueous solution containing a water-soluble polymerization initiator, a crosslinking agent and a hydrophilic, polymerizable, monomer having a reactive functional group in the molecule, said reactive functional group being selected from the group consisting of amino groups and hydroxyl groups, with (2) a dispersion of fine particles of a highly water-absorptive resin dispersed in an organic liquid, said highly water-absorptive resin being capable of absorbing water in an amount of from 10 to 1500 times the weight of said resin, said resin being selected from the group consisting of polymers of acrylic acid, alkali metal salts of acrylic acid, methacrylic acid and alkali metal salts of methacrylic acid, said resin having a water content of 50 percent by weight or lower, whereby said fine particles are impregnated with said monomer and said crosslinking agent, the amount of said monomer being in the range of from 1 to 100% of the amount of said resin, and polymerizing said monomer to form a polymer on the surfaces of said fine particles so that the reactive functional groups of said polymer are present on the surfaces of said fine particles whereby said fine particles become highly reactive and remain highly water-absorptive.

2. A process for preparing a highly reactive, water-absorptive resin, which comprises the steps of:

mixing (1) an aqueous solution containing a water-soluble crosslinking agent and a hydrophilic polymer having reactive functional groups in the molecule, said reactive functional groups being selected from the group consisting of amino groups and hydroxyl groups, with (2) a dispersion of fine particles of a highly water-absorptive resin dispersed in an organic liquid, said highly water-absorptive resin being capable of absorbing water in an amount of from 10 to 1500 times the weight of said resin, said resin being selected from the group consisting of polymers of acrylic acid, alkali metal salts of acrylic acid, methacrylic acid and alkali metal salts of methacrylic acid, said resin having a water content of 50 percent by weight or lower, whereby said fine particles are impregnated with said polymer, the amount of said polymer being in the range of from 1 to 100% of the amount of said resin and, crosslinking said polymer to form crosslinked polymer on the surfaces of said fine particles so that the reactive functional groups of said polymer are present on the surfaces of said fine particles whereby said fine particles become highly reactive and remain highly water-absorptive.

3. A process for preparing a highly reactive, water-absorptive resin, which comprises the steps of mixing (A) an aqueous phase consisting essentially of a polymerizable, water-soluble, first monomer selected from the group consisting of acrylic acid, methacrylic acid and alkali metal salts thereof, and a water-soluble, polymerization initiator dissolved in water, with (B) an oil phase comprising a non-polar organic liquid, to form a water-in-oil suspension and polymerizing said monomer to obtain a dispersion of particles of a highly water-absorptive resin and containing water, said particles being dispersed in said non-polar organic liquid, said resin containing carboxyl or alkali metal carboxylate groups and being capable of absorbing an amount of water in the range of from 10 to 1500 times the weight of said resin;

removing water from said dispersion so that said resin has a water content of 50 percent by weight or less;

then mixing (1) said dispersion in which said resin has a water content of 50 percent by weight or less, with (2) an aqueous solution of a hydrophilic, polymerizable, second monomer having a reactive functional group in the molecule, a crosslinking agent and a water-soluble initiator, said reactive functional group being selected from the group consisting of hydroxy and amino, the amount of said second monomer being from 1 to 100% of the weight of said resin;

polymerizing said second monomer to form a polymer of said second monomer on the surfaces of said resin particles so that said reactive functional groups of the polymer of said second monomer are present on the surfaces of said resin particles whereby said resin particles become highly reactive and remain highly water-absorptive; and then removing said organic liquid to obtain particles of said resin.

4. A process for preparing a highly reactive, water-absorptive resin, which comprises the steps of mixing (A) an aqueous phase consisting essentially of a polymerizable, water-soluble, first monomer selected from the group consisting of acrylic acid, methacrylic acid and alkali metal salts thereof, and a water-soluble, polymerization initiator dissolved in water, with (B) an oil phase comprising a non-polar organic liquid, to form a water-in-oil suspension and polymerizing said monomer to obtain a dispersion of particles of a highly water-absorptive resin and containing water, said particles being dispersed in said non-polar organic liquid, said resin containing carboxyl or alkali metal carboxylate groups and being capable of absorbing an amount of water in the range of from 10 to 1500 times the weight of said resin;

removing water from said dispersion so that said resin has a water content of 50 percent by weight or less;

then mixing (1) said dispersion in which said resin has a water content of 50 percent by weight or less, with (2) an aqueous solution of a hydrophilic polymer having a reactive functional group in the molecule and a water-soluble crosslinking agent, said reactive functional group being selected from the group consisting of hydroxy and amino, the amount of said polymer being from 1 to 100% of the weight of said resin;

cross-linking said polymer and coating the surfaces of said resin particles with the resulting cross-linked polymer so that said reactive functional groups of said polymer are present on the surfaces of said resin particles whereby said resin particles become highly reactive and remain highly water-absorptive; and then removing said organic liquid to obtain particles of said resin.

5. A process as claimed in claim 1 or claim 2, wherein said water-absorptive resin is a hydrophilic polymer prepared by the reversed-phase suspension polymerization of an aqueous solution of a hydrophilic monomer selected from the group consisting of acrylic acid, methacylic acid and alkali metal salts thereof, said aqueous solution containing a water-soluble initiator.

6. A process as claimed in claim 1, claim 2, claim 3 or claim 4, wherein said highly water-absorptive resin is a polymer or a copolymer of acrylic acid or an alkali metal acrylate.

7. A process as claimed in claim 1, claim 2, claim 3 or claim 4, wherein the water content of said highly water-absorptive resin is in the range of from 1 to 50% by weight.

8. A process as claimed in claim 1, claim 2, claim 3 or claim 4, wherein the water content of said highly water-absorptive resin is in the range of from 10 to 40% by weight.

9. A process as claimed in claim 2 or claim 4, wherein said hydrophilic polymer is selected from the group consisting of a polymer or copolymer of (meth)acrylamide, N,N-dimentylaminoethyl (meth)acrylate, N,N-diethylaminoethyl (meth)acrylate, vinylpyridine, vinylpyrrolidone, allylamine, 2-hydroxyethyl (meth)acrylate, polyethylene glycol (meth)acrylate, vinylsulfonate, styrene sulfonic acid and 2-acrylamido-2-methylpropanesulfonic acid; polyethyleneimine; polyacrolein; polyethylene glycol and Hofmann degradation product of polyacrylamide.

10. A process as claimed in claim 2 or claim 4, wherein said crosslinking agent is polyglycidyl ether, halo-epoxy compound, polyaldehyde, polyol or polyamine.

11. A process as claimed in claim 1 or claim 3, wherein said hydrophilic monomer is selected from the group consisting of acylamide, methacrylamide, N,N-dimethylaminoethyl methacrylate, N,N-diethylaminoethyl methacrylate, vinylpyridine, vinylpyrrolidone, 2-hydroxyethyl acrylate, 2-hydroxyethyl methacrylate, polyethylene glycol(meth)acrylate, vinylsulfonate, styrene-sulfonic acid, acrylonitrile and methacrylonitrile.

12. A process as claimed in claim 1, claim 2, claim 3 or claim 4 in which said highly water-absorptive resin is a homopolymer of acrylic acid, alkali metal salt of acrylic acid, methacrylic acid or alkali metal salt of methacrylic acid.

13. A process as claimed in claim 1, claim 2, claim 3 or claim 4 in which said highly water-absorptive resin is a homopolymer of sodium acrylate.

* * * * *